United States Patent [19]

Isban et al.

[11] Patent Number: 4,645,286
[45] Date of Patent: Feb. 24, 1987

[54] QUICK CONNECT POWER TAP SYSTEM

[75] Inventors: Elliot Isban, 161 Mill Rd., Stamford, Conn. 06903; Charles F. Stephenson; Robert F. Cook, both of Westport, Conn.

[73] Assignee: Elliot Isban, Stamford, Conn.

[21] Appl. No.: 465,439

[22] Filed: Feb. 10, 1983

[51] Int. Cl.$^4$ .................................... H01R 13/625
[52] U.S. Cl. ..................... 339/125 L; 339/189 R; 339/197 B; 339/122 F
[58] Field of Search ............... 339/122 R, 122 F, 123, 339/127 RC, 181 R, 188 R, 189 R, 189 L, 190, 197 B

[56] References Cited

U.S. PATENT DOCUMENTS

| | | |
|---|---|---|
| 1,486,896 | 3/1924 | Hubbell . |
| 1,595,919 | 8/1926 | Paiste . |
| 1,595,966 | 8/1926 | Kempton . |
| 1,595,972 | 8/1926 | De Reamer . |
| 1,603,884 | 10/1926 | Van Amberg . |
| 1,639,125 | 8/1927 | Benjamin . |
| 1,666,223 | 4/1928 | Symmes . |
| 1,963,218 | 6/1934 | Wakefield ......................... 240/78 |
| 2,110,133 | 3/1938 | Douglas ......................... 339/127 R |
| 2,492,475 | 12/1949 | Granger ......................... 339/190 X |
| 2,494,428 | 1/1950 | Buck ................................. 173/332 |
| 3,225,186 | 12/1965 | Duncan ........................... 240/10.64 |
| 3,503,032 | 3/1970 | Routh et al. ......................... 339/14 |
| 3,798,584 | 3/1974 | Person ............................. 339/14 R |
| 3,951,488 | 4/1976 | Hesse et al. ..................... 339/190 X |
| 3,985,417 | 10/1976 | Fenton ............................ 339/122 F |
| 4,107,770 | 8/1978 | Weber ................................. 362/405 |
| 4,222,093 | 9/1980 | Garcia et al. ...................... 362/147 |

FOREIGN PATENT DOCUMENTS 2902192  7/1980  Fed. Rep. of Germany ... 339/188 R Primary Examiner—Eugene F. Desmond
Attorney, Agent, or Firm—F. Eugene Davis, IV; Mark P. Stone

[57] ABSTRACT

A coupling device which allows for quickly changing electrical fixtures without rewiring. The quick change mounting fixture comprises a combined electrical and mechanical two-piece male and female fastening device. The invention allows for consumer as well as professional installation and detachment of fixtures by providing an easy and safe method. All wires and contacts are self contained and shielded from accidental contact. The invention comprises a female receptacle plate for mounting to a standard ceiling or wall mounted electrical junction box, a male tap support plate which also functions as a fixture support, a block terminal support, where contacts and wire routes are located, and a shield cover.

4 Claims, 12 Drawing Figures

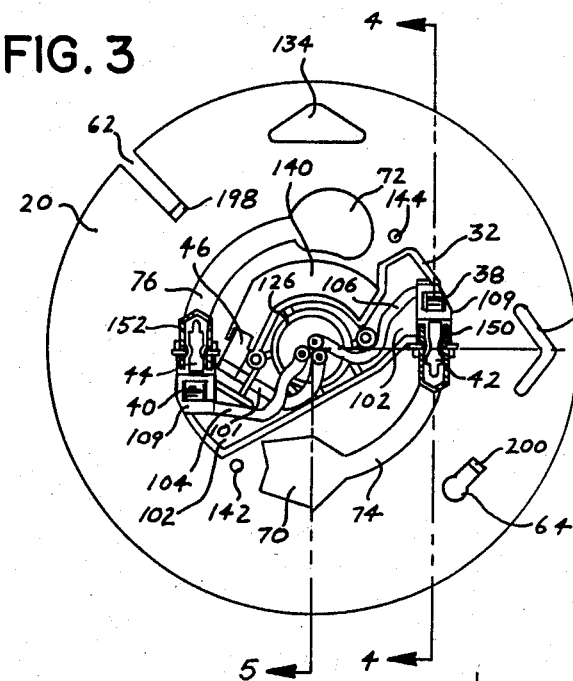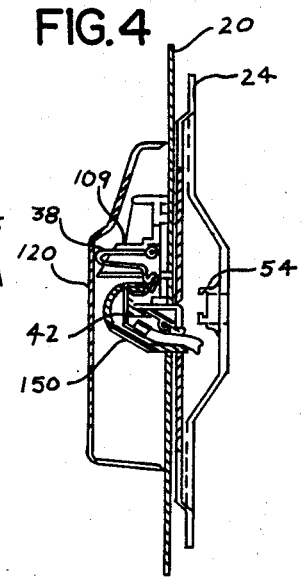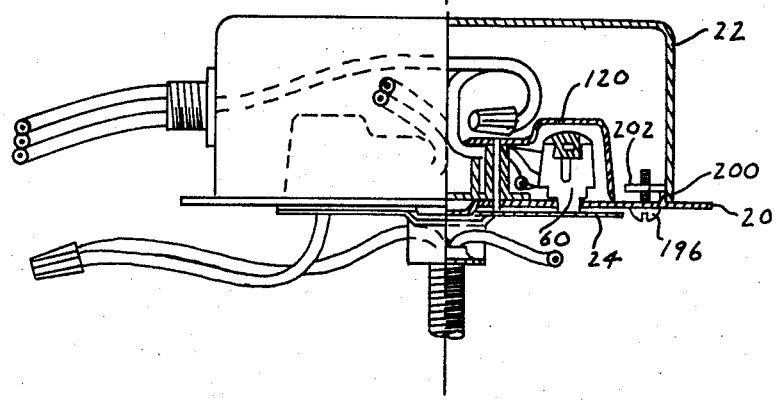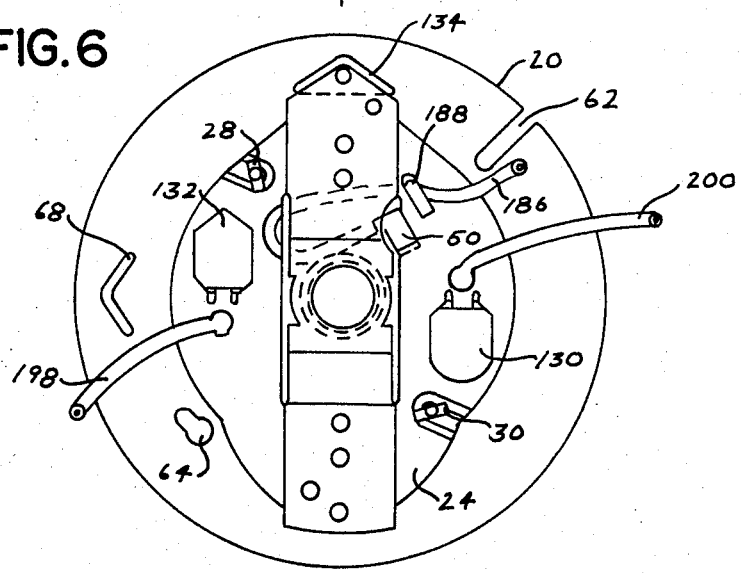

FIG. 7
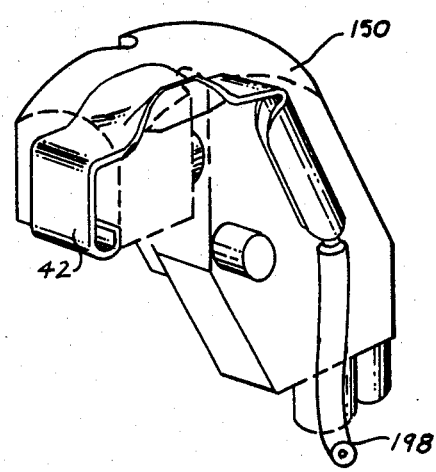
FIG. 8
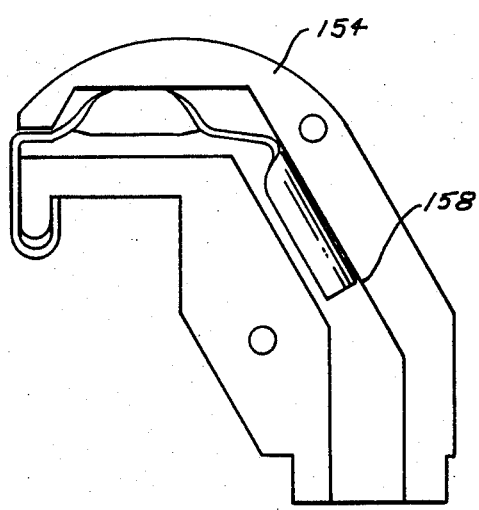
FIG. 9
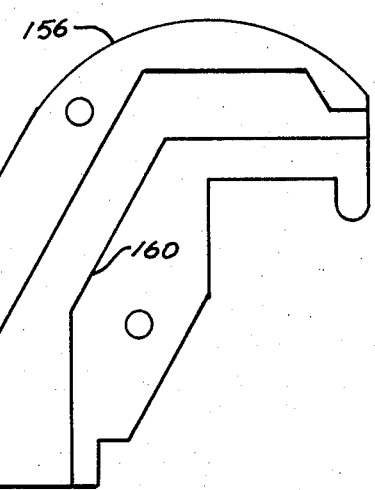
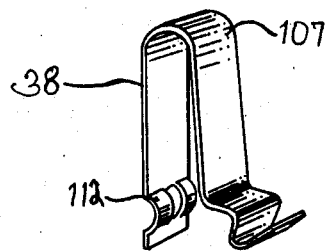
FIG. 10
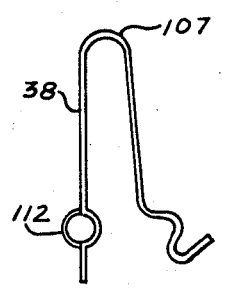
FIG. 11
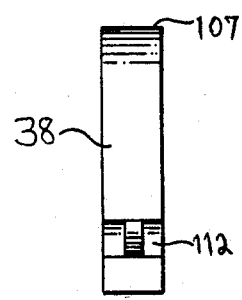
FIG. 12

4,645,286

QUICK CONNECT POWER TAP SYSTEM

TECHNICAL FIELD

This invention relates to a quick connect power tap system. More particularly it relates to combined electrical and mechanical connectors for ready detachable mounting and connection of electrical devices such as hanging lighting fixtures, ceiling fans, smoke detectors, current suppressors, switching devices and the like. The power tap of the invention is characterized by establishing electrical and mechanical connection to an existing junction box in a single operation.

BACKGROUND ART

The complexity and problems associated with the installation or removal of lighting fixtures and has resulted in increased costs to consumers by requiring professional installation or removal. That added cost or safety considerations deter removal of fixtures when, for example, servicing or cleaning the fixture, painting the adjacent ceiling or wall, or relocating the fixture elsewhere. When consumers or even professionals do choose to install fixtures themselves, extreme caution needs to be taken to avoid shock or to prevent fires, due to accidental contact with live wires, shorts, or from an improper connection. This procedure is fatiguing, awkward, and dangerous when done from a ladder—hands held over head—trying to accomplish the following tasks: holding the unit to be installed, wiring, holding tools, and holding the correct parts needed.

Devices for quickly connecting lighting fixtures and other permanently fixed devices are known. However, these devices, as a result of their complexity and the inherent danger of working with electrical wires, are difficult to install and can only be used with a specific fixutre or device.

Other difficulties of the prior art quick connect devices are their inability to support heavy fixtures; use of materials which deteriorate and fatigue over time particularly when subjected to high temperatures often present in incandescent installations, particularly in insulated ceilings; the fact that the plug and socket portions are presently or unconventionally attached to the fixture and box respectively so that one unfamiliar with the system cannot safely or easily remove the socket from the box or the plug from the fixture without special instruction; their lack of proper polarization; failure to provide electrical wire leads for connection to the power leads and fixture leads using common wire nuts with leads all being color coded; failure to provide proper wire strain relief; inability to be installed to improperly installed junction boxes; lack of modularity and adaptability to a variety of electrical devices so that a standard plug and socket connection can be used for all devices, i.e., any device may be plugged into a standard socket; and short cycle life, i.e., they fail after a few uses.

The material composition and dangerous electrical design of the prior art quick connect devices has prevented commercial acceptance of those devices and these devices have not achieved listing by Underwriters Laboratories. Their cost of production is high because of their complex construction. Thus, there is a need for a device relatively simple in construction, which is safe to install, and acceptable for use with the variety of fixtures used in residential, industrial and commercial applications. The present invention represents a substantial improvement over the prior art by fulfilling these needs.

DISCLOSURE OF THE INVENTION

The present invention overcomes many of the problems and disadvantages of the prior art by providing a relatively simple and safe quick connect power tap system, which is attached on one end to a ceiling or wall and to the fixture fittings on the other end. The invention is safe and easy for inexperienced persons to install, with all wires securely enclosed, thus preventing electrical shorts or shock caused by accidental contact. The relative simplicity of the invention enables consumers to make changes and improvements in their living environment at minimum costs while expanding their options in fixtures available for their use.

Briefly and referring to FIG. 1, the tap of the invention comprises an upper female plate 20 which is affixed to a standard 4" junction box 22, and a male lower plate 24 which connects to the fixture fittings generally illustrated at 26. Both the upper and lower plates 20 and 24 are composed of electro-zinc plated low carbon steel. The electro-mechanical connection is attained by inserting fittings mounted to the lower plate 24 into the upper plate 20 and rotating the lower plate 90°. Full rotation of the lower plate 24 allows it to drop into a locked position and establishes electrical contact. The electrical and mechanical contact is maintained by turning thumb screws 28 and 30, forcing plates 20 and 24 apart.

Now referring to FIG. 2, an insulating terminal block 32 of plastics material such as polycarbonate is affixed to the upper plate 20 by means of rivets 34, 36. Contacts 38 and 40 are connected via wires (not shown in FIG. 2) to the hot and neutral electrical wires in the junction box 22. Male contacts 42 and 44 engage the lower portions of contacts 38 and 40 (only the lower portion of contact 38 is shown in FIG. 2). Contact 46 is connected via a wire not shown to the ground wire within the junction box 20 and is mounted on tab 48 on plate 20. Ground contact 50 is connected via wires not shown in FIG. 2 to the ground wire of the electrical device to be mounted and is mounted on tab 52 on lower plate 24.

Contacts 42 and 44 and their assemblies 150 and 152 are mounted on tabs 58 and 60.

In operation, the electrical device is connected mechanically to plate 24 by a threaded nipple (92, FIG. 1) fitting into the tapped hole 54 which is crimped at the top to prevent over insertion of the nipple 92 or by utilizing other screw holes in plate 24 such as screw holes 56 (not shown in FIG. 2) and the wires attached to contacts 42, 44, and 50 are connected to the respective ground, neutral and hot wires of the electrical device to be mounted. The wires connected to contacts 38, 40 and 46 are connected to the respective hot, neutral and ground wires within the junction box 22 and the plate 20 is affixed to the junction box in the usual manner by way of screw slot 62 and screw keyhole 64.

Bottom plate 24 is brought up into engagement with top plate 20 with arrowhead edge 66 of bottom plate aligned with the arrowhead slot 68 of top plate 20. Contacts 42 and 44 pass through holes 70 and 72 respectively. Then bottom plate 24 is rotated and tab 60 rides in slot 74 and tab 58 rides in slot 76. The fixture can no longer fall since the lower shoulders 59 and 61 of the tabs 58 and 60 cannot pass through the slots 74 and 76.

Ground contact 50 fits in slot 140. Ground contacts 46 and 50 come together and wipe across each other to establish good electrical ground contact. This is the first contact established.

As the bottom plate continues to turn, tabs 58 and 60 come to the enlarged ends 78 and 80 of slots 76 and 74. At this time contacts 42 and 44 come into engagement with contacts 38 and 40. The lower plate 24 is then pulled away from the upper plate 20 either by the weight of the fixture or manually, and the tabs 58 and 60 drop down in the slots 78 and 80 to engage their upper shoulders 82 and 84. As the plates 20 and 24 are separated, contacts 42 and 44 wipe across contacts 38 and 40 to establish proper electrical connection.

It should be noted that in accordance with an Underwriters Laboratories' probe test the insertion of a screw driver or other probe-like device through any of the holes in the upper plate 20 in no way can cause contact between the screw driver and the contacts 38 and 40, because the open portions of the contacts 38 and 40 face upwardly and radially. It is an important feature of the invention that the lower plate contacts 42 and 44 face downwardly and radially and are brought up over the contacts 38 and 40 and then drop down wiping them to establish electrical contact.

OBJECTS OF THE INVENTION

It is therefore an object of the present invention to provide a quick connect power tap system for the electromechanical installation of lighting fixtures, smoke detectors, ceiling fans, and the like.

It is a further object of the present invention to provide a quick connect power tap system as described above which will improve, facilitate, and simplify the installation of hanging electric lighting fixtures, chandeliers, smoke detectors, ceiling fans, and other devices requiring premanent mounting and electrifying to standard mounted junction boxes and to provide an easily installed system for these and similar applications.

It is another object of the present invention to simplify the removal of the above devices for service, building maintenance, or exchange, without the use of any tools and which is achieved without handling or disturbing any electrical wires, thereby eliminating any dangers to the electrical system or the user.

It is another object of the invention to provide a quick connect power tap system of the above character for accomplishing the mechanical attachment of various equipment to a junction box without the present trial and error method of holding incorrect size parts, i.e., threaded nipples and screws together with the equipment itself while the installer is in a dangerous and awkward position atop a portable ladder which is typically used, thereby minimizing exposure to such dangerous circumstances.

It is an additional object of the present invention to provide a quick connect power tap system as described above which is substantially vibration resistant and thus insures the electro-mechanical integrity of the invention.

It is another object of the present invention to provide a quick connect power tap system as described above which is substantially fire resistant.

It is another object of the present invention to provide a quick connect power tap system as described above which insures proper electrical function where mechanical failure occurs and proper mechanical function where electrical failure occurs.

It is another object of the present invention to provide a quick connect power tap system as described above in which the contacts are automatically "wiped" or cleaned during assembly of the parts comprising the invention, thus insuring contact integrity.

It is still another object of the present invention to provide a quick connect power tap system as described above that prevents accidental physical contact with the electrical contacts from a probe or other source.

Other objects of the invention will in part be obvious and will in part appear hereinafter.

The invention accordingly comprises the features of construction and arrangement of parts possessing the features, properties, and relationship of elements which will be exemplified in the construction hereinafter set forth.

The scope of the invention is indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 3 is a top plan view of the tap system of FIG. 1 with the cover shield removed;

FIG. 4 is a cross sectional view of the tap system of FIG. 1 taken along the line 4—4 of FIG. 3;

FIG. 5 is a cross sectional view of the tap system of FIG. 1 taken along the line 5—5 of FIG. 3;

FIG. 6 is a bottom plan view of the tap system of FIG. 1;

FIG. 7 is a perspective view of one of the male connectors of the tap system of the invention;

FIG. 8 is an enlarged side view of a portion of the connector of FIG. 7;

FIG. 9 is an enlarged side view of a portion of the connector of FIG. 8;

FIG. 10 is an enlarged perspective view of a spring contact employed in the upper block terminal of the tap system of FIG. 1;

FIG. 11 is a side view thereof; and

FIG. 12 is a front view thereof.

The same reference characters refer to the same elements throughout the several views of the drawings.

BEST MODE FOR CARRYING OUT THE INVENTION

Figure 1:
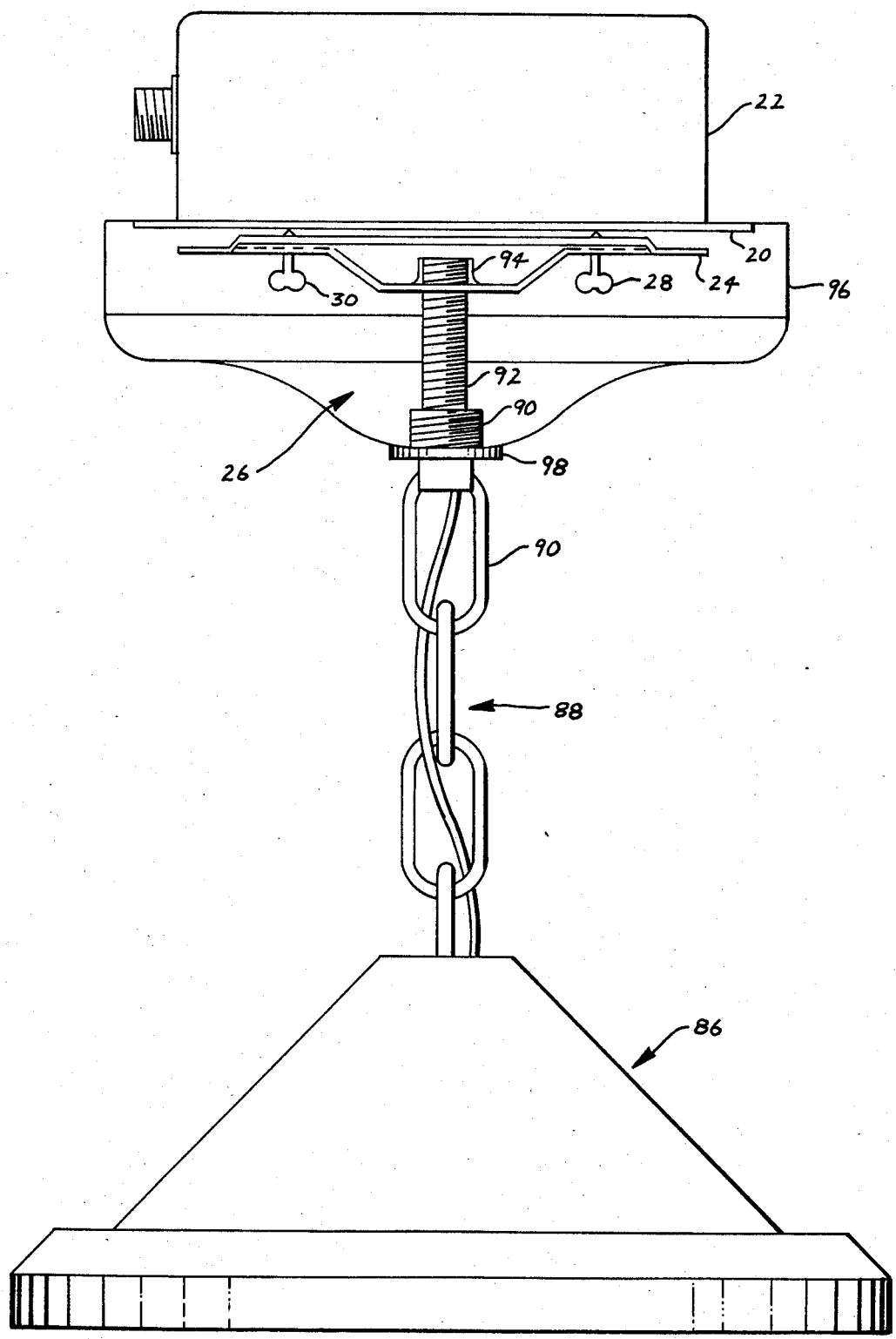
FIG. 1 is a diagrammatic side view of an electrical fixture installed with the quick connect power tap system of the invention.

Again referring to FIG. 1, a hanging electrical fixture generally indicated at 86 is suspended by means of chain 88. Nut 98 affixed to chain 88 is screwed on to nipple 92 which in turn is screwed into hickey 94 of bottom plate 24. The fixture 86 is provided with a three wire cable which is laced through chain 88, loop 90, and nipple 92. After installation of the fixture the canopy 96 is installed using the usual screw collar 98 which screws onto the outer threaded portion of loop 90.

Now referring to FIG. 3, it will be noted how the terminal block 32 provides passageways 102 for the pigtails 104 and 106 attached to contacts 40 and 38 respectively. Similarly, terminal block 32 provides passageway 102 for the pigtail 108 attached to the ground contact 46.

Figure 2:
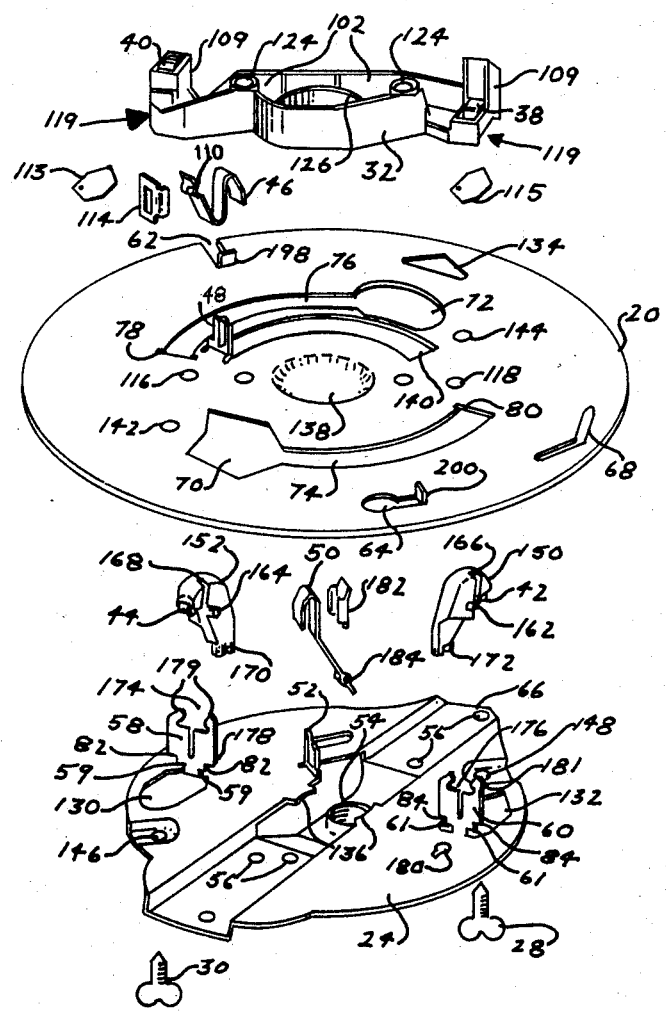
FIG. 2 is an exploded perspective view of the quick connect power tap system of FIG. 1.

During assembly ground contact 46 is mechanically affixed to pigtail 108 at wire accepting portion 110 of contact 46 (FIG. 2). Similarly, contacts 38 and 40 are affixed to their pigtails 104 and 106 at their wire accepting portions 112 (see FIGS. 10, 11 and 12). Electrical contacts 38 and 40 are then pushed into contact block 32 through the bottom thereof, which is open, such that their upper bight portion 107 (see FIGS. 10, 11 and 12) passes up through upstanding portions 109 of terminal block 32. Pigtails 104 and 106 are passed through an opening, not shown, in the side wall 111 of upstanding portion 109 into the channel 102 of the terminal block 32. After the contacts 38 and 40 are in place in the contact block 32, insulating covers 113 and 115 are applied to the open bottom portions 117 and 119 through which contacts 38 and 40 were inserted.

A C-shaped clip 114 is placed on contact 46, which is then pushed onto tab 48. Clip 114 and tab 48 are shaped so that ground contact 46 will be permanently captured. Terminal block 32 is then placed on plate 20 and may be provided with aligning studs (not shown) which engage aligning holes 116 and 118. An insulating shield 120 is then placed over the entire assembly and it is riveted down by means of rivets 34 and 36, passing through holes 122, in shield 120, and 124 in the electrical contact block 32 and into plate 20. Shield 120 prevents debris or wires from entering from the top and shorting or jamming the mechanism, and probelike objects from being inserted through the slots 74, 76 and 140 and piercing the insulation or breaking connections between the wiring in the junction box 22.

Thus the three pigtails pass over a circular raised portion 126 of the terminal block 32 and through hole 128 in the cover plate 120. This provides some mechanical strain relief for the pigtails.

It will be noted that in addition to upper plate 20 being provided with arrowhead cutout 68 to which arrowhead edge 66 of bottom plate 24 is aligned for insertion, holes 70 and 72 through which tabs 58 and 60 pass are differently shaped and the cutouts 130 and 132 adjacent to respective tabs 58 and 60 are correspondingly shaped to aid alignment. Thus cutout 70 is in the shape of the tail of an arrow and cutout 132 is in the shape of an arrow, while cutouts 72 and 130 are oval shaped.

Upper plate 20 is also provided with an open arrowhead 134 to which arrow edge 66 is pointed when the lower plate 24 is fully engaged with the upper plate 20 and final mechanical position achieved.

Referring to FIG. 2, lower plate 24 is provided with aligned arcuate guide edges 136 which align with and are guided by recessed portion 138 of upper plate 20 while tabs 58 and 60 are rotated in slots 74 and 76. Slot 140 is provided in upper plate 20 through which ground tab 52 and ground contact 50 pass for engagement with ground contact 46 mounted on tab 48. The circular asymmetry between the single slot 74 and the double slots 76 and 140 provides for positive polarization of the tap system.

As shown in FIG. 2, thumb screws 28 and 30 are provided with conical ends which engage holes 142 and 144 in upper plate 20. This locks the two plates 20 and 24 against relative rotation. The thumb screws 30 and 28 are engaged in threaded holes 146 and 148 which are provided in recessed portions of the plate 24, so that the thumb screws can be crimped on their upper portions and held captive in the plate 24.

Still referring to FIG. 2, contacts 42 and 44 are held within identical housings 150 and 152. As shown in FIGS. 7, 8 and 9, housing 150 comprises two clam shells 154 and 156. Each has a channel 158 and 160 for the contact 42 and its attached pigtail 198. As shown in FIG. 2, the housings are provided on either side with pins 162 and 164. The housings 150 and 152 are also provided with aligned slots 166 and 168 and depending key-shaped portions 170 and 172.

The tabs 58 and 60 are provided with a receiving cutouts 174 and 176 which engage slots 166 and 168, and are slightly sprung open by bumps 177 located therein (FIG. 7). Thus the housings 150 and 152 are dropped into the shaped tines 179 and 181 of tabs 58 and 60. The keys 170 and 172 engage correspondingly shaped keyholes 178 and 180. The pins 162 and 164 pressing against the upstanding tabs 58 and 60, and the keys 170 and 172 in slots 178 and 180 provide a lever action interlock between the contact housings 150, 152, and the tabs 58 and 60 and prevent rocking. Ground tab 50 is provided with a C-shaped clip 182 for mechanical interlock with upstanding tab 52 on plate 24. It is also provided with a wire receiving portion 184 to which a pigtail is attached before the contact 50 is attached to tab 52.

Referring to FIG. 6, after the contact is attached to tab 52, the pigtail 186 is provided strain relief under tab 188.

The assembled upper plate 20 and lower plate 24 may be sold as a unit for installation of a fixture in an existing outlet box, or the assembled upper plate 20 may be sold to builders for installation to outlet boxes at the time of their installation and the assembled lower plate 24 to electrical fixture manufacturers for assembly to their fixtures. In this case the purchaser of an electrical fixture merely has to plug in the fixture, the assembled lower plate 24 forming a male electrical connector and the upper plate 20 attached to the junction box 22, the female connector, or plug and socket respectively.

Referring to FIG. 2, the ground contacts 46 and 50 are resiliently engaged before the end of the rotary motion between the plates 20 and 24 and then are wiped as the plates are pulled apart. Thus, the ground connection is the first made and last broken for electrical safety.

Referring to FIG. 4, it will be seen in detail how female contact 38 is engaged by male contact 42. When the plates 20 and 24 are close together and the lower plate rotated into its locked position, the lower bight portion 190 of contact 42 pushes against the lower bight portion 192 of contact 38. Then as the plates 20 and 24 are axially separated, bight portion 190 wipes across the bight portion 192 and comes into engagement with the terminating edge 194 of contact 38, thus establishing good electrical continuity. The same thing is of course true with respect to contacts 44 and 40. That is, the contacts first engage resiliently, wipe and a bite portion is pushed against a terminating edge portion.

SUMMARIZING INSTALLATION

Pigtails 104, 106 and 108 of the plate 20 are connected to the respective ground, neutral and hot wires within the junction box 22 and the plate is fastened to the junction box by means of screws 196,-only one of which is shown in FIG. 5, in the manner of a coverplate. Special tabs 198 and 200 are provided at slot 62 and keyhole 64 which engage the screw hole tabs 202 (only one of which is shown in FIG. 5). These prevent the screws 198 and 200 from distorting plate 20.

The ground pigtail 186 and the hot and neutral pigtails 198 and 200 (see FIG. 6) of the lower plate assembly are connected to the respective wires of the electrical fixture to be installed. The fixture is mechanically connected by means of the threaded loop 90 and nipple 92 threaded in hole 54 or by the various screw holes provided in the lower plate 24. Then all that is required to install the fixture electrically and mechanically is to engage contacts 42 and 44 through the slots 70 and 72 and rotate, then separate the plates and turn thumb screws 28 and 30 to make the electrical and mechanical connections entirely secure.

One advantage of the tap system when the lower plate asesmbly is supplied to the consumer with the electrical fixture is that the nipple 92 may be the precise length required for the particular fixture canopy installation.

It will thus be seen that the objects set forth above among those made apparent from the preceding description, are efficiently attained and, since certain changes may be made in the above disclosed tap system without departing from the scope of the invention is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

We claim:

1. An electrical quick connect power tap system comprising:
   A. a socket comprising:
      a. a front surface,
      b. a pair of concentric semicircular slots in said front surface, each terminating at each end at an opening wider than said slot, the opening at one end being wider than the other,
      c. a pair of socket contacts spaced away from and to the rear of said front surface and presenting a radially disposed surface generally perpendicular to said front surface, and
      d. insulating surfaces surrounding each of said contacts and preventing contact therewith except on said generally perpendicular surface from the rear of said front surface and arcuately with respect to the axis of said concentric slots, and
   B. a plug comprising:
      a. a front surface, and
      b. a pair of uprights adapted to fit through the wider openings of said slots, each of said uprights comprising portions of three widths, a first narrow portion narrower than the one of said slots into which it fits, a second wider portion fitting into the narrower of the two wider openings of the one of said slots into which it fits, and a third widest portion fitting into the widest of the two wider openings of the one of said slots into which it fits, said portions being spaced from the front surface of said plug in order of the narrowest, wider, and widest portions; and
      c. a pair of plug electrical contacts adapted to mate with said female contacts wiping against them in an axial motion toward said front surface of said socket when said wider portion of said uprights are fitted into the two narrower of the two wider openings of said slots.

2. An electrical quick connect connector as defined in claim 1 wherein said socket contacts are located adjacent the ends of said slots having the narrower openings, and said plug electrical contacts are mounted to said uprights.

3. An electrical quick connect power tap system as defined in claim 1, and
   B. a pair of mating ground contacts, one mounted to said plug and one mounted to said socket, said ground contacts comprising radially disposed surfaces adapted to mate before said plug and socket contacts mate and to wipe against each other during the wiping of said plug and socket contacts.

4. An electrical quick connect power tap system as defined in claims 1 or 2, wherein said socket contacts each present a terminating end portion closer to the front surface of said socket than said radially disposed surface, and each of said plug contacts presents a depending surface for engagement with the corresponding of said terminating end portions of said socket contacts at the end of said axial motion.

* * * * *